United States Patent [19]
Novak

[11] 3,939,540
[45] Feb. 24, 1976

[54] CUTTING BIT HOLDER WITH REVERSIBLE CLAMP

[75] Inventor: Arne Novak, Sollentuna, Sweden

[73] Assignee: Wlajko Mihic, Gavle, Sweden

[22] Filed: Apr. 2, 1975

[21] Appl. No.: 564,397

[30] Foreign Application Priority Data
Apr. 8, 1974 Sweden ............................ 74047176

[52] U.S. Cl. .................................................. 29/96
[51] Int. Cl.² ............................................ B26D 1/00
[58] Field of Search ................................... 29/95, 96

[56] References Cited
UNITED STATES PATENTS

| | | |
|---|---|---|
| 2,949,662 | 8/1960 | Cook et al. ............................ 29/96 |
| 3,124,864 | 3/1964 | Frommelt ............................... 29/96 |
| 3,140,627 | 7/1964 | Walby .................................. 29/96 X |
| 3,557,417 | 1/1971 | Kollar .................................... 29/96 |

*Primary Examiner*—Harrison L. Hinson
*Attorney, Agent, or Firm*—Sughrue, Rothwell, Mion, Zinn & Macpeak

[57] ABSTRACT

A holder body 10 has a slender extension 11 provided with a V-shaped seat 12 for a similarly notched cutting bit 13. The tapered leg 18 of a reversible L-shaped clamp 19 bears against a recess 16 in the bit. A rear shoulder 21 in the holder body provides a fulcrum for the clamp, which is fastened to the body and urged against a rear face 22 thereof by a screw 26 engaging slightly offset holes 24 and 27 in the clamp and body, respectively.

5 Claims, 4 Drawing Figures

FIG.1
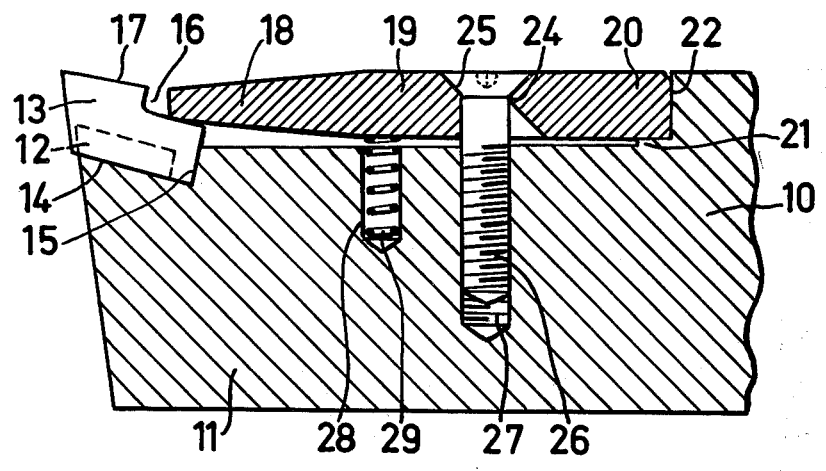
FIG.2
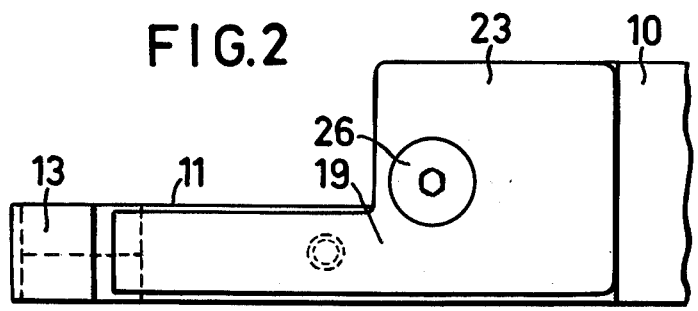
FIG.3 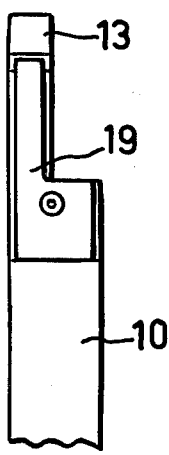 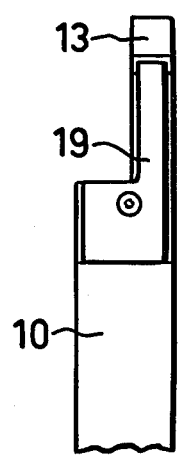 FIG.4

CUTTING BIT HOLDER WITH REVERSIBLE CLAMP

BACKGROUND OF THE INVENTION

1. Field of the Invention

This invention relates to a tool holder, preferably for cutting bits, wherein the holder body has an extended slender part forming a seat for receiving a detachable insert which is fastened in place by a clamping device.

2. Description of the Prior Art

It is known to provide tool holders with detachable cutting tool inserts, where the insert, which usually consists of a hard metal plate, is fastened to the holder body by means of a clamping device. There has previously been proposed a great variety of embodiments of such a clamping device to provide shapes which are suitable for many different needs. This has resulted in large stock requirements in order to have the many different models of clamping devices, holders and inserts in ready availability.

SUMMARY OF THE INVENTION

The purpose of this invention is to reduce the need for such large stocks by limiting the assortment of clamping devices, whereby the clamping device at the same time shall provide firm clamping of the insert.

An advantage is that the holder body is very easy to manufacture since the front part of the body forming the seat for the rear part of the clamping device can be cut through its entire width. In previous arrangements relating to such cutting tools the front part of the holder body has been shaped to a special form suiting the individual clamping device. Such shapes are very difficult to manufacture. In this invention the clamping device is supported along at least one of its sides extending in a longitudinal direction to the tool holder at its rear end. By such an arrangement the clamping device is securely held against tilting movements. To achieve this secure fastening of the clamping device without such a special support the screw hole in the holder body and in the clamping device are displaced relative to each other about 0.15 mm causing the rear side of the clamping device to press against a shoulder in the holder body.

BRIEF DESCRIPTION OF THE DRAWINGS

In the drawings:

FIG. 1 shows a section through a holder according to the invention,

FIG. 2 shows a plan view of the holder,

FIG. 3 shows the holder in a left position, and

FIG. 4 shows the holder in a right position.

DESCRIPTION OF THE PREFERRED EMBODIMENT

As appears from FIG. 1 the holder body 10 is provided with an extended part 11, the front part of which forms a seat 12 for receiving a cutting bit insert 13 of hard metal. The bottom surface 14 of the insert is, in conformance with the surface of the seat, V-shaped to provide a rigid and secure fastening of the insert in the holder. The rear end surface of the insert abuts a shoulder 15 in the holder, and said end surface also has a recess 16 extending across part of the upper surface 17 of the insert. The recess 16 receives a nose 18 of a leg, the thickness of which gradually decreases, of an L-shaped clamping device 19 the rear end 20 of which with its bottom surface rests on a shoulder 21 in the holder body. This rear part also abuts a second shoulder 22 in the holder. At the middle of the second leg 23 of the L-shaped clamping device there is provided a hole 24 whose openings 25 on both sides of the clamping device are conical. The clamping device can be fastened to the holder body by a screw 26 engaged in a threaded bore 27.

The extended part 11 is also provided with a bore 28 between the screw 26 and the nose 18 of the leg intended to receive a spring 29. The purpose of this spring is to lift the clamping device 19 to facilitate changing the insert 13.

As appears from FIGS. 3 and 4, the clamping device can be reversed and used with both left and right holder bodies, which results in a 50 percent reduction of the stock needs for clamping devices of this type.

Instead of the rear end of the insert abutting the shoulder 15, it can contact a pin located behind the insert or be held in exact position by the front end of the clamping device 19, in which cases there is no need of a separate rear set for the insert.

What is claimed is:

1. A cutting tool holder including a holder body having an extended slender part (11) and a seat (12) intended to receive a detachable cutting bit (13) fastened to the body by a clamping device (19), characterized by: the clamping device, in relation to a vertical plane longitudinally bisecting the slender part (11), being unsymmetrical and being L-shaped, with one leg being substantially the same width as the slender part and one end of such leg abutting the bit while the other leg is accommodated in a recess in the front part of the holder body with the rear end of said other leg pressed against a shoulder formed in the recess, the recess extending over the entire width of the holder body, whereby the clamping device in a first position can be placed on a holder body having a cutting bit to the left of the longitudinal centerline of the holder body and in a second, reversed position can be placed on a holder body where the citting bit is to the right to said centerline.

2. A cutting tool holder according to claim 1 wherein the clamping device is symmetrical about a horizontal plane bisecting it.

3. A cutting tool holder according to claim 1 wherein the nose of said one let is adapted to press the cutting bit against the seat and said other leg is provided with a hole (24) through which a screw is fastened in the holder body.

4. A cutting tool holder according to claim 3 wherein the hole is conically countersunk from both sides.

5. A cutting tool holder according to claim 3 wherein the holder body has a hole and a spring is positioned therein and abuts the clamping device when the clamping device is fastened on the holder body.

* * * * *